Jan. 11, 1949.   G. O. TURNBULL   2,458,808
SUPPORTING STRUT
Filed June 2, 1944
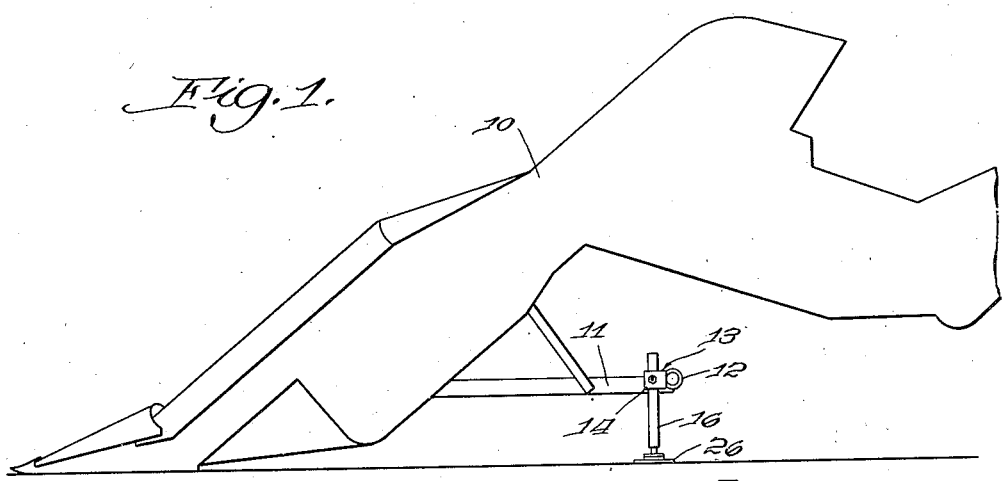
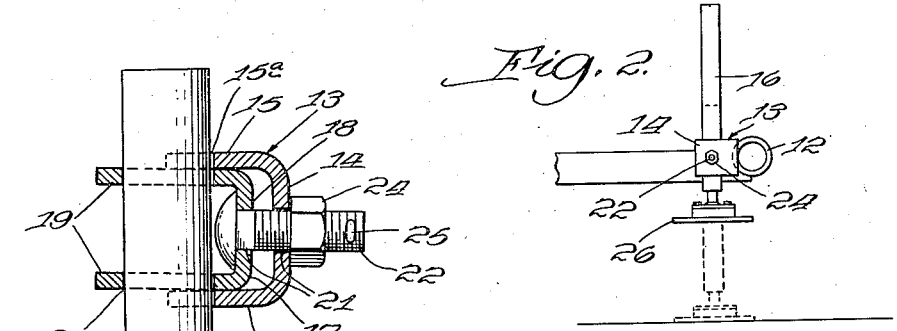
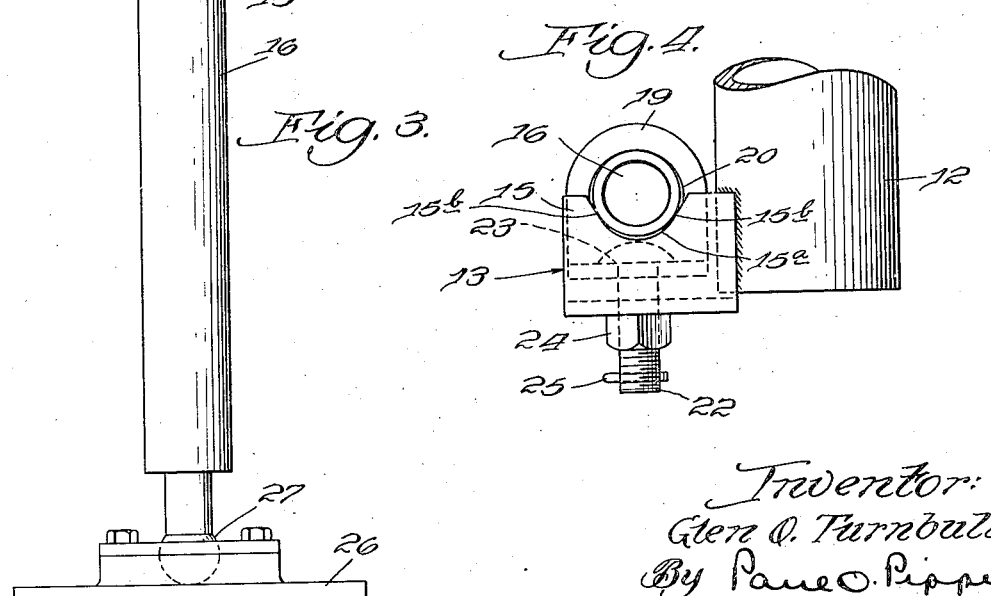
Inventor:
Glen O. Turnbull.
By Paul O. Pippel
Atty.

Patented Jan. 11, 1949

2,458,808

UNITED STATES PATENT OFFICE 2,458,808

SUPPORTING STRUT

Glen O. Turnbull, Rock Island, Ill., assignor to International Harvester Company, a corporation of New Jersey Application June 2, 1944, Serial No. 538,461

4 Claims. (Cl. 248—351)

This invention relates to an improved supporting strut designed primarily for supporting implements in stand-by condition—that is, implements which are stored when not being used.

The invention has for its object to provide, in a manner as hereinafter set forth, an extendible supporting strut adapted to be permanently attached to the frame structure of an implement to be supported. A plurality of struts may be utilized if desired although the implement may be partially supported on its own frame structure and partially on the struts of the invention. It is the intention to carry the strut on the implement when it is used—for example, attached to a tractor or other wheel-supporting structure. The struts are then always available whenever the implement is to be removed or whenever it is desired to support a portion or all of its weight on the supporting struts.

To the above ends and to others which may hereinafter appear, the invention consists of the novel construction and arrangement of parts as will be more specifically referred to and which are illustrated in the accompanying drawings wherein is shown an embodiment of the invention.

In the drawings,

Figure 1 is a side elevation of the outline of a corn-picker structure showing one of the supporting struts of the invention;

Figure 2 is an enlarged view of the attaching strut shown in Figure 1 with the supporting member in collapsed or lifted position;

Figure 3 is an enlarged view at right angles to the views of Figures 1 and 2, showing the securing means of the strut in section;

Figure 4 is a plan view of the strut shown in Figure 1 with a portion of the attaching frame structure of the implement also being shown.

In Figure 1 of the drawings, a harvester unit 10 of a conventional type utilized for gathering corn from standing stalks, is illustrated. Said unit is adapted to be mounted on a tractor as shown, for example, in United States Patent No. Re. 22,279, March 2, 1943. As the tractor to which said units or implements are attached is used for other purposes, it is desirable to remove the implements from the tractor and store the implements until they are again needed. In an implement of the type illustrated, the weight of the implement may rest partially on a portion of the implement frame structure. However, in order to locate the implement so that it may be readily applied to the tractor, it is necessary to support a portion of the implement on struts, jacks, or other supporting means. The struts forming this invention are particularly designed for this purpose.

The frame structure of the harvester unit 10 includes a longitudinally extending member 11 and a transversely extending, tubular member 12. A supporting strut embodying the invention may be connected permanently to the member 12 as shown in the drawings.

A channel-shaped member, indicated generally by the reference character 13, has a vertical portion 14 and two spaced, horizontal portions 15 connected to the vertical portions 14. Said portions 15 are formed at their terminating ends with semi-circular notches 15a which are adapted to embrace a vertical cylindrical strut member 16. The notches 15a have flattened side portions 15b which engage the strut 16 at circumferentially spaced points. Said strut member may be a hollow pipe or a solid shaft having sufficient strength to support the weight of the implement which it is to carry. A second channel-shaped member, indicated in its entirety by the reference character 17, is fitted within the channel-shaped member 13. Said second channel-shaped member has a vertical portion 18 and two spaced, horizontally-extending portions 19 connected to the portion 18. The portions 19 are provided with aligned circular openings 20 of a diameter somewhat larger than the outside diameter of the strut member 16. Said portions are preferably hardened to assure their biting into the member 16 and to prevent wear which might render the device inoperative or liable to slip. The side portions 15b of the notches 15a and the contacting points of the portions 19 form a three point grip on the strut member 16.

The channel-shaped members 13 and 17 are provided with aligned openings 21 in their vertical portions 14 and 18. A bolt 22 is provided with a head 23 seated within the channel member 17 and abutting the inner surface of the vertical portion 18 thereof. Said bolt extends through openings 21 and is provided with an adjustable nut 24, a key 25 being provided at the end of the bolt to prevent loss of the nut 24. In the use of the supporting strut as above described, it is normally carried during operation of the implement in the position shown in Figure 2. As in that position there is no vertical load on the member 16, the nut 24 may be tightened to assure that the strut member remains in position. When the implement is to be supported in the position shown in Figure 1, the nut 24 is loosened sufficiently to allow the strut member 16 to be slid downwardly to ground-engaging position. Any type of ground-engaging foot having the required area for the load to be supported may be utilized. As illustrated, a foot member 26 is secured to a ball end portion 27 provided at the lower end of the strut member 16. To place in position for varying the load, the strut member 16 is merely pushed downwardly into ground-engaging position. As soon as load is applied, the inner channel member 17 is cocked, without appreciable limitation by the short horizontal positions 15 which terminate short of the overhanging portions 19 as illustrated in Figure 3, whereby the horizontal portions 19 bite into the cylindrical surface of the member 16, holding any load which may be applied thereto. The principle of this type of holding device is conventional, being used in many arts. Applicant, however, has provided an improved simplified form utilizing two engaging means formed in a single sheet metal structure. Said structure is given the necessary support to carry the load by means of the surrounding channel member 13. By means of this arrangement, a simple effective holding means is provided which will support the load applied thereto. Said structure is particularly adapted to implements or similar devices, such as house trailers, where a supporting means is to be used only a portion of the time and which requires no adjustment after it is extended into functioning position.

It is to be understood that the drawings show only a preferred embodiment of the invention, and that applicant claims as his invention all changes, variations, and modifications which may be resorted to which fall within the scope of the appended claims.

What is claimed is:

1. A holding means for a cylindrical shaft comprising in combination with a shaft, a U-shaped sheet metal member having respective axially spaced notches which are slightly larger in diameter than the shaft, each of said notches having side portions for engaging the shaft at circumferentially spaced points, said shaft extending through said notches and in engagement with said side portions, a second U-shaped member fitted within the first and being of an over-all width slightly less than the inside width of the first member, said second member having alined circular openings through which said shaft projects, said openings being slightly larger in diameter than the diameter of the shaft, the spaced portions around the notches of the first mentioned U-shaped member being positioned to form three point grips on the shaft with the openings in the second U-shaped member, and means for holding the two members together consisting of a headed element and a nut threaded thereon whereby the relative positions of the two members may be adjusted.

2. A supporting strut including a vertical shaft, a channel-shaped sheet metal member having spaced horizontal portions formed with semicircular notches at their open sides and a vertical connecting portion, said shaft resting in said notches, means for connecting said member to a structure to be supported by said strut, a second channel-shaped member loosely fitted within the first and having spaced horizontal portions of an over-all width slightly less than the inside distance between the horizontal portions of the first member, said horizontal portions being provided with alined circular openings through which said shaft projects, said openings being slightly larger in diameter than the diameter of the shaft, and means for holding the two channel-shaped elements together, the horizontal portions of the first mentioned channel-shaped member being short relative to the horizontal portions of the second channel-shaped member whereby the overhanging portions of the second member are free to cock for gripping the shaft.

3. A supporting strut including a vertical shaft, a channel-shaped sheet metal member having spaced horizontal portions formed with semicircular notches at their open sides and a vertical connecting portion, said shaft resting in said notches, means for connecting said member to a structure to be supported by said strut, a second channel-shaped member loosely fitted within the first and having spaced horizontal portions of an over-all width slightly less than the inside distance between the horizontal portions of the first member, said horizontal portions being provided with aligned circular openings through which said shaft projects, said openings being slightly larger in diameter than the diameter of the shaft whereby slight cocking action of the horizontal portions of the second channel-shaped member permitted by the loose fit in the first mentioned channel member locks the second channel member to the shaft in load-carrying position, and adjustable means for holding the two channel-shaped elements together and to permit slight relative movement of the respective spaced horizontal portion.

4. A supporting strut including a vertical shaft, a channel-shaped sheet metal member having spaced horizontal portions formed with semicircular notches at their open sides and a vertical connecting portion, said shaft resting in said notches, means for connecting said member to a structure to be supported by said strut, a second channel-shaped member loosely fitted within the first and having spaced horizontal portions provided with alined circular openings through which said shaft projects and a vertical portion connecting the horizontal portions, said openings being slightly larger in diameter than the diameter of the shaft whereby slight cocking action of the horizontal portions of the second channel-shaped member permitted by the loose fit in the first mentioned channel member locks the second channel member to the shaft in load-carrying position, said vertical portions being provided with aligned openings, and means extending through said openings holding the two members together and to permit slight relative movement of the respective spaced horizontal portion.

GLEN O. TURNBULL.

REFERENCES CITED

The following references are of record in the file of this patent:

UNITED STATES PATENTS

| Number | Name | Date |
|---|---|---|
| 487,770 | Proctor | Dec. 13, 1892 |
| 1,235,613 | Vandergrift | Aug. 7, 1917 |
| 1,260,826 | Somers | Mar. 26, 1918 |
| 1,315,621 | Barlow | Sept. 9, 1919 |
| 1,800,641 | Johnson | Apr. 14, 1931 |
| 2,162,181 | Skinner | June 13, 1939 |
| 2,271,194 | Ingwer et al. | Jan. 27, 1942 |